US007885478B2

(12) United States Patent
Lee et al.

(10) Patent No.: US 7,885,478 B2
(45) Date of Patent: Feb. 8, 2011

(54) NOISE REDUCTION METHOD AND NOISE REDUCTION APPARATUS

(75) Inventors: Wei-Kuo Lee, Hsinchu County (TW); Yun-Hung Shen, Hsinchu (TW)

(73) Assignee: MSTAR Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 12/544,711

(22) Filed: Aug. 20, 2009

(65) Prior Publication Data
US 2009/0310884 A1 Dec. 17, 2009

Related U.S. Application Data

(63) Continuation-in-part of application No. 11/432,551, filed on May 12, 2006, now abandoned.

(60) Provisional application No. 60/682,407, filed on May 19, 2005.

(51) Int. Cl.
G06K 9/40 (2006.01)

(52) U.S. Cl. .................. 382/275; 382/254; 382/274; 382/255

(58) Field of Classification Search ............ 382/274, 382/275, 255
See application file for complete search history.

(56) References Cited

U.S. PATENT DOCUMENTS

| 5,522,022 | A | * | 5/1996 | Rao et al. .................. 345/440 |
| 5,903,681 | A | | 5/1999 | Rueby et al. |
| 6,026,190 | A | * | 2/2000 | Astle .......................... 382/232 |
| 6,108,455 | A | | 8/2000 | Mancuso |

(Continued)

FOREIGN PATENT DOCUMENTS

JP 2000217039 A * 8/2000

(Continued)

OTHER PUBLICATIONS

Lin et al, "Salt-Pepper Impulse Noise Detection and Removal Using Multiple Thresholds for Image Restoration", Journal of Information Science and Engineering 22, pp. 189-198 2006.*

(Continued)

Primary Examiner—Yubin Hung
Assistant Examiner—Avinash Yentrapati
(74) Attorney, Agent, or Firm—WPAT, PC; Justin King

(57) ABSTRACT

The present invention provides a noise reduction method for use in reducing noise of a digital image, the method comprising steps of: providing a plurality of luminance threshold values; determining a plurality of luminance feature values according to the luminance value of a target pixel and the luminance values of neighboring pixels of the target pixel; determining whether the target pixel is a noise point based on the comparison between each of the luminance feature values and each of the luminance threshold values corresponding thereto, respectively; and adjusting the luminance value, a first chrominance value and a second chrominance value of the target pixel if the target pixel is determined as a noise point. Using the noise reduction method of the present invention, not only noise of a digital image can be identified, but also the degradation caused by the noise can be reduced and thus the overall picture quality can be improved.

18 Claims, 4 Drawing Sheets

U.S. PATENT DOCUMENTS

| | | | |
|---|---|---|---|
| 6,415,062 B1 * | 7/2002 | Moed et al. | 382/260 |
| 6,718,068 B1 * | 4/2004 | Gindele et al. | 382/254 |
| 6,807,300 B1 * | 10/2004 | Gindele et al. | 382/167 |
| 6,904,169 B2 * | 6/2005 | Kalevo et al. | 382/167 |
| 6,950,547 B2 * | 9/2005 | Floeder et al. | 382/143 |
| 6,970,587 B1 * | 11/2005 | Rogers | 382/132 |
| 6,983,078 B2 * | 1/2006 | Baggs | 382/275 |
| 7,171,045 B1 * | 1/2007 | Hamilton | 382/166 |
| 7,176,982 B2 * | 2/2007 | Zhu et al. | 348/620 |
| 7,623,723 B2 * | 11/2009 | Avinash | 382/254 |
| 7,756,658 B2 * | 7/2010 | Kulkarni et al. | 702/83 |
| 2002/0001409 A1 * | 1/2002 | Chen et al. | 382/167 |
| 2002/0110269 A1 * | 8/2002 | Floeder et al. | 382/141 |
| 2003/0007699 A1 * | 1/2003 | Trifonov et al. | 382/275 |
| 2003/0099287 A1 * | 5/2003 | Arambepola | 375/227 |
| 2003/0189655 A1 | 10/2003 | Lim et al. | |
| 2003/0228067 A1 * | 12/2003 | Miyake et al. | 382/275 |
| 2004/0196408 A1 * | 10/2004 | Ishikawa et al. | 348/616 |
| 2004/0208395 A1 * | 10/2004 | Nomura | 382/275 |
| 2004/0233334 A1 * | 11/2004 | Zhu et al. | 348/607 |
| 2004/0246378 A1 * | 12/2004 | Okada et al. | 348/625 |
| 2005/0078222 A1 * | 4/2005 | Liu et al. | 348/700 |
| 2005/0123211 A1 * | 6/2005 | Wong et al. | 382/254 |
| 2005/0276510 A1 * | 12/2005 | Bosco et al. | 382/275 |
| 2006/0193010 A1 * | 8/2006 | Kakutani | 358/3.13 |
| 2006/0245002 A1 * | 11/2006 | Kita | 358/3.26 |
| 2007/0103594 A1 * | 5/2007 | Zhu et al. | 348/607 |

FOREIGN PATENT DOCUMENTS

| | | |
|---|---|---|
| WO | WO2004/062275 | 7/2004 |

OTHER PUBLICATIONS

Singh et al, "Adaptive Rank-Ordered Mean Filter for Removal of Impulse Noise from Images",Industrial Technology, 2002. IEEE ICIT '02. 2002 IEEE International Conference on , vol. 2, no., pp. 980-985 vol. 2, Dec. 11-14, 2002.*

* cited by examiner

NOISE REDUCTION METHOD AND NOISE REDUCTION APPARATUS

BACKGROUND OF THE INVENTION

1. Field of the Invention

The present invention generally relates to a noise reduction method and apparatus and, more particularly, to a noise reduction method and apparatus using a luminance value of a target pixel and luminance values of neighboring pixels of the target pixel so as to identify and eliminate a noise point of a digital image.

2. Description of the Prior Art

In digital image processing, the most generally used method to reduce noise is to directly process the pixels related to the image. For example, averaging filters and sequence statistical filters are used according to respective requirements.

Conventionally, impulse noise is eliminated using a median filter, which is a non-linear spatial filter operating corresponding to the pixel values in a neighboring region of a target pixel so as to sort the pixel values and then make the median pixel replace the target pixel. However, the median filter performs pixel adjustment for the entire image including some non-noise portions. Therefore, the noise reduction process using the median filter may lead to undesirable distortion of the image because it cannot identify where noise occurs. Moreover, since the pixel is adjusted according to the pixel values of the neighboring pixels, the adjusted image shows unnaturalness in luminance and chrominance.

Accordingly, the present invention provides a noise reduction method not only to identify noise of a digital image, but also to reduce noise by adjusting the luminance value and the chrominance value to avoid image distortion.

Compared to the prior art, the noise reduction method of the present invention exhibits excellent performance in noise reduction while remaining the original colors in the region where there is no noise determined.

SUMMARY OF THE INVENTION

It is a primary object of the present invention to provide a noise reduction method so as to identify noise in a digital image and adjust the luminance value and the chrominance values of a pixel that is determined a noise point so that the image quality is improved and the image distortion is avoided.

In order to achieve the foregoing object, the present invention provides a noise reduction method, comprising steps of: providing a plurality of luminance threshold values; determining a plurality of luminance feature values according to a luminance value of a target pixel and luminance values of neighboring pixels of the target pixel by a calculating unit of the display; determining whether the target pixel is a noise point, by a comparing unit of the display, based on the comparison between each of the luminance feature values and each of the luminance threshold values corresponding thereto, respectively; and adjusting the luminance value of the target pixel, by an adjusting unit of the display, when the target pixel is determined as the noise point.

The luminance feature values are determined by: (1) the luminance value of the target pixel and the luminance values of four neighboring pixels, the target pixel and the four neighboring pixels forming a cross shape; (2) the luminance value of the target pixel and the luminance values of four neighboring pixels, the target pixel and the four neighboring pixels forming an X shape; (3) the luminance values of the neighboring pixels; or (4) the luminance value of the target pixel and a mean luminance value of the neighboring pixels.

Preferably, the luminance feature value comprises a first luminance feature value, a second luminance feature value, a third luminance feature value and a fourth luminance feature value. The first luminance feature value is determined by the luminance value of the target pixel and the luminance values of four neighboring pixels, the target pixel and the four neighboring pixels forming a cross shape. The second luminance feature value is determined by the luminance value of the target pixel and the luminance values of four neighboring pixels, the target pixel and the four neighboring pixels forming an X shape. The third luminance feature value is determined by the luminance values of the neighboring pixels. The fourth luminance feature value is determined by the luminance value of the target pixel and a mean luminance value of the neighboring pixels.

Preferably, the luminance threshold value comprises: a first luminance threshold value, a second luminance threshold value, a third luminance threshold value and a fourth luminance threshold value. The first luminance threshold value, the second luminance threshold value and the third luminance threshold value are pre-determined. The fourth luminance threshold value is determined by the luminance values of the neighboring pixels of the target pixel and the mean luminance value of the neighboring pixels of the target pixel.

Preferably, the first luminance feature value is larger than the first luminance threshold value, the second luminance feature value is larger than the second luminance threshold value, the third luminance feature value is smaller than the third luminance threshold value and the fourth luminance feature value is larger than the fourth luminance threshold value, so that the target pixel is determined a noise point.

The step of adjusting the luminance value of the target pixel comprises steps of: selecting a luminance median from a series including the luminance value of the target pixel and the luminance values of the neighboring pixels; and performing a luminance weighting calculation so as to adjust the luminance value of the target pixel according to the luminance median.

The step of adjusting the chrominance value of the target pixel comprises steps of: selecting a chrominance median from a series including the chrominance value of the target pixel and chrominance values of the neighboring pixels; and performing a chrominance weighting calculation so as to adjust the chrominance value of the target pixel according to the chrominance median.

In order to achieve the foregoing object, the present invention provides a noise reduction apparatus, comprising: a calculating unit, for determining a plurality of luminance feature values according to a luminance value of a target pixel of the digital image and luminance values of neighboring pixels of the target pixel; a comparing unit, for determining whether the target pixel is a noise point based on the comparison between each of the luminance feature values and each of luminance threshold values corresponding thereto, respectively; and an adjusting unit, adjusting the luminance value of the target pixel when the target pixel is determined as the noise point.

Accordingly, the present invention provides a noise reduction method using the luminance profile of the target pixel and its neighboring pixels to determine a plurality of luminance feature values to be compared with a plurality of luminance threshold values so as to determine whether the target pixel is infected with noise, which is to be eliminated by adjusting the luminance value and the chrominance value of the target pixel.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE PREFERRED EMBODIMENT

The present invention providing a noise reduction method and a noise reduction apparatus can be exemplified by the preferred embodiment as described hereinafter.

Figure 1:
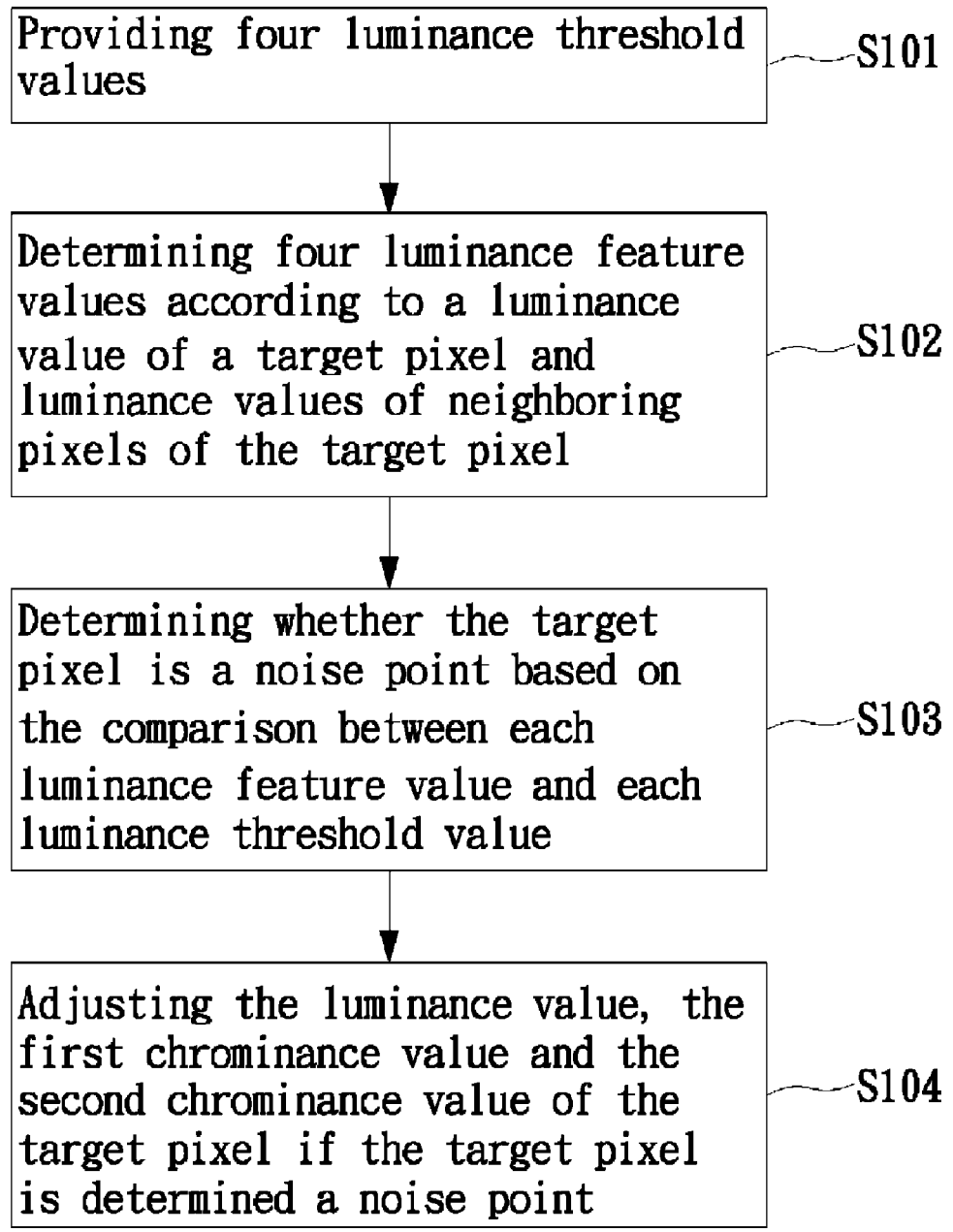
FIG. 1 is a flowchart showing steps of the noise reduction method according to the preferred embodiment of the present invention.

The noise reduction method provided by the present invention can be applied in an image display such as TVs or monitors. Please refer to FIG. 1, which is a flowchart showing steps of the noise reduction method according to the preferred embodiment of the present invention. First, as described in Step S101, four luminance threshold values are provided. The first luminance threshold value, the second luminance threshold value and the third luminance threshold value are pre-determined. The fourth luminance threshold value is determined by the luminance values of the neighboring pixels of a target pixel and the mean luminance value of the neighboring pixels of the target pixel.

Then, in Step S102, four luminance feature values are determined according to a luminance value of the target pixel and the luminance values of neighboring pixels of the target pixel. The first luminance feature value is determined by the luminance value of the target pixel and the luminance values of four neighboring pixels, the target pixel and the four neighboring pixels forming a cross shape. The second luminance feature value is determined by the luminance value of the target pixel and the luminance values of four neighboring pixels, the target pixel and the four neighboring pixels forming an X shape. The third luminance feature value is determined by the luminance values of the neighboring pixels. The fourth luminance feature value is determined by the luminance value of the target pixel and a mean luminance value of the neighboring pixels. In one embodiment, the Step S102 can be performed by a calculating unit of a display when the noise reduction method is applied in the display.

In Step S103, each luminance feature value and each luminance threshold value are compared so as to determine whether the target pixel is a noise point. The first luminance feature value is larger than the first luminance threshold value, the second luminance feature value is larger than the second luminance threshold value, the third luminance feature value is smaller than the third luminance threshold value and the fourth luminance feature value is larger than the fourth luminance threshold value, so that the target pixel is determined a noise point. In one embodiment, the Step S103 can be performed by a comparing unit of the display.

Finally, in Step 104, the luminance value and the chrominance value of the target pixel is adjusted if the target pixel is determined a noise point. The step of adjusting the luminance value of the target pixel comprises steps of: selecting a luminance median from a series including the luminance value of the target pixel and the luminance values of the neighboring pixels; and performing a luminance weighting calculation so as to adjust the luminance value of the target pixel according to the luminance median. The step of adjusting the chrominance value of the target pixel comprises steps of: selecting a chrominance median from a series including the chrominance value of the target pixel and chrominance values of the neighboring pixels; and performing a chrominance weighting calculation so as to adjust the chrominance value of the target pixel according to the chrominance median. In one embodiment, the Step S104 can be performed by an adjusting unit of the display.

Figure 2:
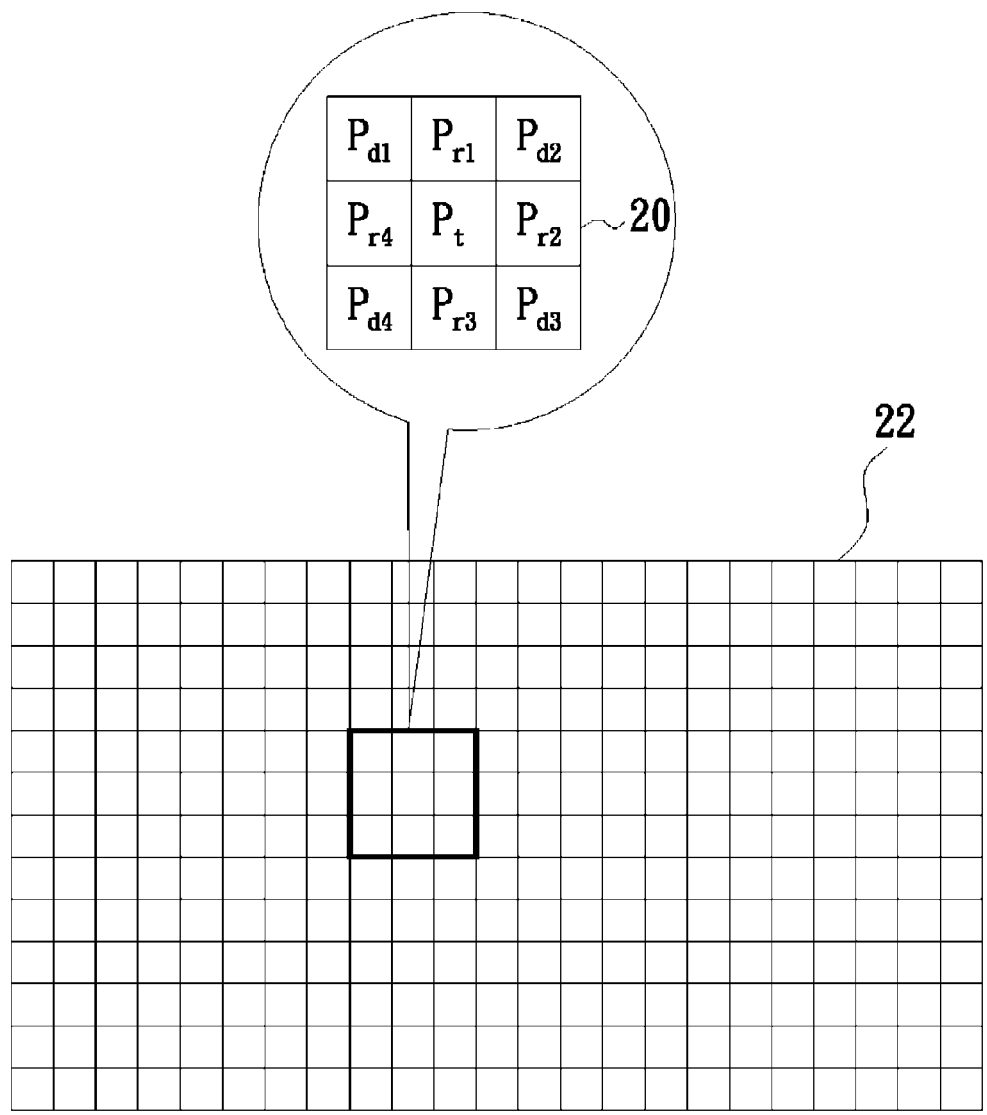
FIG. 2 is a schematic diagram showing a target pixel and its neighboring pixels according to the preferred embodiment of the present invention.

Please refer to FIG. 2, which is a schematic diagram showing a target pixel and its neighboring pixels according to the preferred embodiment of the present invention. A 3×3 mask 20 comprises nine pixels, wherein the central pixel Pt is a target pixel and the neighboring pixels that forms a X shape with the target pixel are Pd1, Pd2, Pd3, Pd4 and the neighboring pixels that forms a cross shape with the target pixel are Pr1, Pr2, Pr3, Pr4. When the target pixel Pt moves from one point in a digital image 22 to another, the mask 20 also moves.

Figure 3:
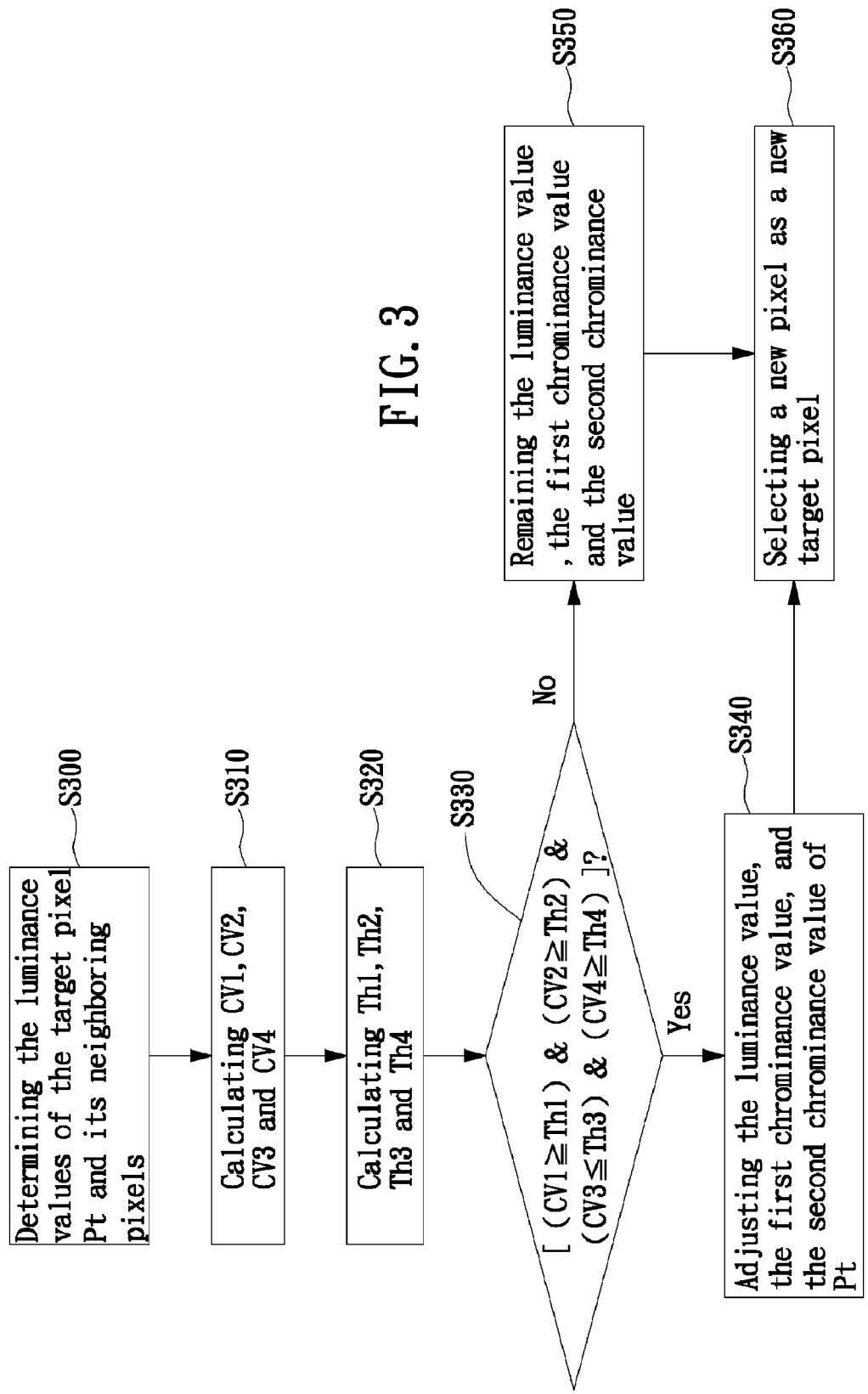
FIG. 3 is a detailed flowchart showing steps of the noise reduction method according to the preferred embodiment of the present invention.

Please refer to FIG. 3, which is a detailed flowchart showing steps of the noise reduction method according to the preferred embodiment of the present invention. First, in Step S300, the luminance value of the target pixel and the luminance values of the neighboring pixels are determined so as to obtain a 3×3 matrix of luminance values, wherein Yt is the luminance value of the target pixel Pt; Yr1, Yr2, Yr3, Yr4 are luminance values corresponding to Pr1, Pr2, Pr3, Pr4, respectively; and Yd1, Yd2, Yd3, Yd4 are luminance values corresponding to Pd1, Pd2, Pd3, Pd4, respectively.

Then, in Step 310, the first luminance feature value CV1, the second luminance feature value CV2, the third luminance feature value CV3, and the fourth luminance feature value CV4 are calculated. CV1, CV2, CV3, and CV4 are expressed as:

$$CV1 = abs[Yr1+Yr2+Yr3+Yr4-K1 \times Yt]$$

$$CV2 = abs[Yd1+Yd2+Yd3+Yd4-K2 \times Yt]$$

$$CV3 = abs[(Yd1+Yd2+Yd3+Yd4)-(Yr1+Yr2+Yr3+Yr4)]$$

$$CV4 = abs[Yt-Y\_mean] \times K4$$

where K1, K2, K3, K4 are constants, Y_mean is a mean value of Yr1, Yr2, Yr3, Yr4, Yd1, Yd2, Yd3, Yd4 and abs is an absolute value operator.

Later in Step 320, the first luminance threshold value Th1, the second luminance threshold value Th2, the third luminance threshold value Th3, and the fourth luminance threshold value Th4 are calculated. Th1, Th2, Th3, and Th4 are luminance threshold values corresponding to CV1, CV2, CV3, and CV4, respectively. The first luminance threshold value Th1, the second luminance threshold value Th2 and the third luminance threshold value Th3 are pre-determined. The fourth luminance threshold value Th4 is expressed as:

$$Th4 = abs[Yr1-Y\_mean]$$

$$+abs[Yr2-Y\_mean]$$

$$+abs[Yr3-Y\_mean]$$

$$+abs[Yr4-Y\_mean]$$

$$+abs[Yd1-Y\_mean]$$

+abs[Yd2−Y_mean]

+abs[Yd3−Y_mean]

+abs[Yr4−Y_mean]

The Step S310 and the Step S320 are in no particular order. In other words, the luminance threshold values can be calculated prior to the calculation of the luminance feature values. After the luminance threshold values and the luminance feature values are obtained, in Step S330, a comparison is made between each luminance threshold value and each luminance feature value so as to determine whether CV1, CV2, CV3 and CV4 are larger than, smaller than or equal to the corresponding Th1, Th2, Th3, and Th4, respectively. The comparison is to determine whether the following statement is true:

[(CV1≧Th1) & (CV2≧Th2) & (CV3≦Th3) & (CV4≧Th4)]

The target pixel Pt is determined a noise point if the statement is true; otherwise, the target pixel Pt is determined a non-noise point.

Finally, in Step 340, the luminance value, a first chrominance value and a second chrominance value of the target pixel Pt are adjusted if the target pixel Pt is determined a noise point. The adjusted luminance value, first chrominance value and second chrominance value are expressed as:

Yt_new=(1−W1)×Yt+W1×Y_median

Cbt_new=(1−W2)×Cbt+W2×Cb_median

Crt_new=(1−W3)×Crt+W3×Cr_median where Yt_new, Cbt_new, Crt_new are the adjusted luminance value, first chrominance value and second chrominance value of the target pixel Pt, respectively; Ybt, Cbt and Crt are the original luminance value, first chrominance value and second chrominance value of the target pixel Pt, respectively; W1,W2 and W3 are weighting values; and Y_median, Cb_median and Cr_median are respectively a luminance median, a first chrominance median and a second chrominance median of a series [Pt, Pd1, Pd2, Pd3, Pd4, Pr1, Pr2, Pr3, Pr4].

In Step S350, the luminance value, first chrominance value and second chrominance value of the target pixel Pt are remained if the target pixel Pt is determined a non-noise point.

After Step 340 or Step 350, another pixel is selected as a new target pixel, as described in Step 360.

Accordingly, through the afore-mentioned steps, the noise point in the digital image 22 can not only be identified, but also be eliminated by adjusting the luminance value and the chrominance values.

Figure 4:
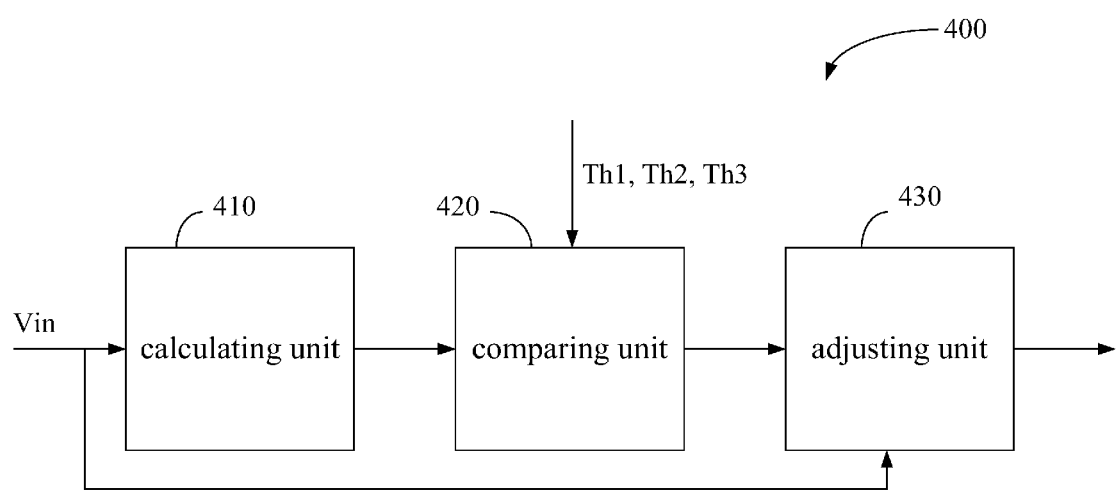
FIG. 4 is a functional diagram of the noise reduction apparatus according to one embodiment of the present invention

Please refer to FIG. 4, which shows a noise reduction apparatus in accordance with one embodiment of the present invention. The noise reduction apparatus 400 can be applied in an image display such as TVs or monitors. The noise reduction apparatus 400 comprises a calculating unit 410, a comparing unit 420, and an adjusting unit 430. The calculating unit 410 receives an input image Vin and calculates four luminance feature values according to a luminance value of a target pixel of the input image and the luminance values of neighboring pixels of the target pixel. The first luminance feature value is calculated by the luminance value of the target pixel and the luminance values of four neighboring pixels, where the target pixel and the four neighboring pixels form a cross shape. The second luminance feature value is calculated by the luminance value of the target pixel and the luminance values of four neighboring pixels, where the target pixel and the four neighboring pixels form an X shape. The third luminance feature value is calculated by the luminance values of the neighboring pixels. The fourth luminance feature value is calculated by the luminance value of the target pixel and a mean luminance value of the neighboring pixels. The calculating unit 410 further calculates a fourth luminance threshold value by the luminance values of the neighboring pixels of the target pixel and the mean luminance value of the neighboring pixels of the target pixel. In one embodiment, the four luminance feature values and the fourth luminance threshold value can be generated by using the equations as described above.

The comparing unit 420 compares the first, second, third, and fourth luminance feature values with the first, second, third, and fourth luminance threshold values (Th1~Th4), respectively, so as to determine whether the target pixel is a noise point. When the first luminance feature value is larger than the first luminance threshold value, the second luminance feature value is larger than the second luminance threshold value, the third luminance feature value is smaller than the third luminance threshold value and the fourth luminance feature value is larger than the fourth luminance threshold value, so that the target pixel is determined as a noise point.

When the target pixel is determined as a noise point, the adjusting unit 430 adjusts the luminance value and the chrominance value of the target pixel. The adjusting unit 430 adjusts the luminance value of the target pixel according to a luminance median by performing a luminance weighting calculation, and the luminance median is selected from a series including the luminance value of the target pixel and the luminance values of the neighboring pixels. The detailed adjusting method of the adjusting unit 430 can be the same as mentioned above.

According to the above discussion, it is apparent that the present invention discloses a noise reduction method and apparatus so as to identify noise in a digital image and adjust the luminance value and the chrominance values of a pixel that is determined a noise point so that the image quality is improved and the image distortion is avoided.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A noise reduction method, applied in a display, for use in reducing noise of a digital image, the method comprising steps of:

providing a plurality of luminance threshold values;

determining a plurality of luminance feature values according to a luminance value of a target pixel and luminance values of neighboring pixels of the target pixel by a calculating unit of the display;

determining whether the target pixel is a noise point, by a comparing unit of the display, based on the comparison between each of the luminance feature values and each of the luminance threshold values corresponding thereto, respectively; and adjusting the luminance value of the target pixel, by an adjusting unit of the display, when the target pixel is determined as the noise point;

wherein a first luminance feature value of the luminance feature values is determined by the luminance value of the target pixel and the luminance values of first four neighboring pixels, and the target pixel and the first four neighboring pixels form a cross shape;

wherein a second luminance feature value of the luminance feature values is determined by the luminance value of the target pixel and the luminance values of second four neighboring pixels, and the target pixel and the second four neighboring pixels form an X shape;
wherein the first luminance feature value is expressed as:

$$CV1 = \text{abs}[Yr1+Yr2+Yr3+Yr4-K1 \times Yt],$$

wherein CV1 is the first luminance feature value, Yt is the luminance value of the target pixel, Yr1, Yr2, Yr3, Yr4 are respectively the luminance values of the first four neighboring pixels that form the cross shape with the target pixel, K1 is a constant and abs is an absolute value operator.

2. The noise reduction method as recited in claim 1, wherein the luminance feature values further comprise:
   a third luminance feature value determined by the luminance values of the neighboring pixels; and
   a fourth luminance feature value determined by the luminance value of the target pixel and a mean luminance value of the neighboring pixels.

3. The noise reduction method as recited in claim 2, wherein the luminance threshold value comprises: a first luminance threshold value, a second luminance threshold value, a third luminance threshold value and a fourth luminance threshold value.

4. The noise reduction method as recited in claim 3, wherein when the first luminance feature value is larger than the first luminance threshold value, the second luminance feature value is larger than the second luminance threshold value, the third luminance feature value is smaller than the third luminance threshold value and the fourth luminance feature value is larger than the fourth luminance threshold value, so that the target pixel is determined as the noise point.

5. The noise reduction method as recited in claim 2, wherein the fourth luminance threshold value is determined by the luminance values of the neighboring pixels of the target pixel and the mean luminance value of the neighboring pixels of the target pixel.

6. The noise reduction method as recited in claim 1, further comprising a step of:
   adjusting a chrominance value of the target pixel if the target pixel is determined as the noise point.

7. The noise reduction method as recited in claim 1, wherein the step of adjusting the luminance value of the target pixel comprises steps of:
   selecting a luminance median from a series including the luminance value of the target pixel and the luminance values of the neighboring pixels; and
   performing a luminance weighting calculation so as to adjust the luminance value of the target pixel according to the luminance median.

8. The noise reduction method as recited in claim 7, wherein the luminance weighting calculation is expressed as:

$$Yt\_new = (1-W1) \times Yt + W1 \times Y\_median$$

wherein Yt_new is an adjusted luminance value of the target pixel, W1 is a weighting value, Yt is the luminance value of the target pixel and Y_median is the luminance median.

9. The noise reduction method as recited in claim 1, wherein the second luminance feature value is expressed as:

$$CV2 = \text{abs}[Yd1+Yd2+Yd3+Yd4-K2 \times Yt]$$

wherein CV2 is the second luminance feature value, Yt is the luminance value of the target pixel, Yd1, Yd2, Yd3, Yd4 are respectively the luminance values of the second four neighboring pixels that form the X shape with the target pixel, K2 is a constant and abs is an absolute value operator.

10. The noise reduction method as recited in claim 1, wherein the luminance feature values comprise a third luminance feature value which is expressed as:

$$CV3 = \text{abs}[(Yd1+Yd2+Yd3+Yd4)-(Yr1+Yr2+Yr3+Yr4)]$$

wherein CV3 is the third luminance feature value, Yd1, Yd2, Yd3, Yd4 are respectively the luminance values of the first four neighboring pixels that form the X shape with the target pixel, Yr1, Yr2, Yr3, Yr4 are respectively the luminance values of the second four neighboring pixels that form the cross shape with the target pixel, and abs is an absolute value operator.

11. The noise reduction method as recited in claim 1, wherein the luminance feature values comprise a fourth luminance feature value which is expressed as:

$$CV4 = \text{abs}[Yt-Y\_mean] \times K4$$

wherein CV4 is the fourth luminance feature value, Yt is the luminance value of the target pixel, Y_mean is the mean luminance value of the neighboring pixels of the target pixel, K4 is a constant and abs is an absolute value operator.

12. The noise reduction method as recited in claim 5, wherein the fourth luminance threshold value is expressed as:

$$Th4 = \text{abs}[Yr1-Y\_mean]+\text{abs}[Yr2-Y\_mean]+\text{abs}[Yr3-Y\_mean]+\text{abs}[Yr4-Y\_mean]+\text{abs}[Yd1-Y\_mean]+\text{abs}[Yd2-Y\_mean]+\text{abs}[Yd3-Y\_mean]+\text{abs}[Yr4-Y\_mean]$$

wherein Th4 is the fourth luminance threshold value, Yd1, Yd2, Yd3, Yd4 are respectively the luminance values of the second four neighboring pixels that form the X shape with the target pixel, Yr1, Yr2, Yr3, Yr4 are respectively the luminance values of the first four neighboring pixels that form the cross shape with the target pixel, Y_mean is the mean luminance value of the neighboring pixels of the target pixel and abs is an absolute value operator.

13. The noise reduction method as recited in claim 1, wherein the luminance value of the target pixel is remained unchanged if the target pixel is determined as a non-noise point.

14. A noise reduction apparatus, applied in a display, for use in reducing noise of a digital image, the apparatus comprising:
   a calculating unit, for determining a plurality of luminance feature values according to a luminance value of a target pixel of the digital image and luminance values of neighboring pixels of the target pixel;
   a comparing unit, for determining whether the target pixel is a noise point based on the comparison between each of the luminance feature values and each of luminance threshold values corresponding thereto, respectively; and
   an adjusting unit, adjusting the luminance value of the target pixel when the target pixel is determined as the noise point;
   wherein a first luminance feature value of the luminance feature values is determined by the luminance value of the target pixel and the luminance values of first four neighboring pixels, and the target pixel and the first four neighboring pixels form a cross shape;
   wherein a second luminance feature value of the luminance feature values is determined by the luminance value of the target pixel and the luminance values of second four neighboring pixels, and the target pixel and the second four neighboring pixels form an X shape;

wherein the first luminance feature value is expressed as:

$CV1 = \text{abs}[Yr1+Yr2+Yr3+Yr4-K1 \times Yt]$, wherein CV1 is the first luminance feature value, Yt is the luminance value of the target pixel, Yr1, Yr2, Yr3, Yr4 are respectively the luminance values of the first four neighboring pixels that form the cross shape with the target pixel, K1 is a constant and abs is an absolute value operator.

15. The noise reduction apparatus as recited in claim 14, wherein the luminance feature values further comprise:
    a third luminance feature value determined by the luminance values of the neighboring pixels; and
    a fourth luminance feature value determined by the luminance value of the target pixel and a mean luminance value of the neighboring pixels.

16. The noise reduction apparatus as recited in claim 14, wherein the luminance threshold value comprises: a first luminance threshold value, a second luminance threshold value, a third luminance threshold value and a fourth luminance threshold value.

17. The noise reduction apparatus as recited in claim 16, wherein when the first luminance feature value is larger than the first luminance threshold value, the second luminance feature value is larger than the second luminance threshold value, the third luminance feature value is smaller than the third luminance threshold value and the fourth luminance feature value is larger than the fourth luminance threshold value, so that the target pixel is determined as the noise point by the comparing unit.

18. The noise reduction apparatus as recited in claim 14, wherein the adjusting unit adjusts the luminance value of the target pixel according to a luminance median by performing a luminance weighting calculation, and the luminance median is selected from a series including the luminance value of the target pixel and the luminance values of the neighboring pixels.

* * * * *